United States Patent Office 3,582,273
Patented June 1, 1971

3,582,273
PROCESS FOR THE PRODUCTION OF ALKALI METAL HYDROXIDES
Ichiro Takeuchi and Yutaka Nagao, Kitajima-machi, Itano-gun, and Haruo Okada, Kamojima-machi, Oe-gun, Tokushima Prefecture, Japan, assignors to Toho Rayon Co., Ltd., Tokyo, Japan
No Drawing. Filed July 22, 1968, Ser. No. 746,323
Claims priority, application Japan, July 20, 1967, 42/46,850
Int. Cl. C01d 1/04; C01f 4/46
U.S. Cl. 23—184                    11 Claims

ABSTRACT OF THE DISCLOSURE

A process for producing alkali metal hydroxide from an alkali metal sulfate whereby said sulfate is reacted in an aqueous medium with a mercaptan and calcium hydroxide or calcium oxide so as to form an alkali metal mercaptide and thereafter hydrolyzing said mercaptide so as to form said alkali metal hydroxide.

BACKGROUND OF THE INVENTION

Field of the invention

The present invention relates to a process for producing an alkali metal hydroxide from an alkali metal sulfate.

Description of the prior art

Various studies have been made to develop a method for producing alkali metal hydroxides from alkali metal sulfates. These studies have resulted in the development of several different processes, such as, the electrolytic process and the hydrogen sulfide process. These conventional processes however have not proved economically feasible for industrial applications.

Thus, an object of this invention is to provide a novel method for producing an alkali metal hydroxide with a high yield by a simple and an economical operation.

SUMMARY OF THE INVENTION

According to the present invention, there is provided a process for producing an alkali metal hydroxide by reacting an alkali metal sulfate with calcium hydroxide or calcium oxide and a mercaptan in an aqueous medium to form an alkali metal mercaptide which is thereafter hydrolyzed to the alkali metal hydroxide.

DETAILED DESCRIPTION OF PREFERRED EMBODIMENTS

According to this invention calcium hydroxide is reacted with a mercaptan to form a water-soluble salt. The salt thus formed is then reacted quite easily with an alkali metal sulfate to provide an alkali metal mercaptide. By heating the alkali metal mercaptide with water, the mercaptide is easily hydrolyzed to form an alkali metal hydroxide and a mercaptan. The mercaptan can be easily recovered in high yield and used repeatedly.

The process of this invention can be further shown by the following reaction formulas:

(1) $Ca(OH)_2 + 2RSH + M_2SO_4 \rightarrow 2RSM + CaSO_4 \cdot 2H_2O$ (2) $RSM + H_2O \rightarrow MOH + RSH$ wherein M represents an alkali metal such as Li, Na, K, and the like, and RSH represents a mercaptan. Various mercaptans can be used in the process of this invention, for instance good results are obtainable with alkyl mercaptans represented by the general formula $C_nH_{2n+1}SH$ (wherein $n$ is a positive integer), such as, methyl mercaptan, ethyl mercaptan, propyl mercaptan, butyl mercaptan, heptyl mercaptan, and the like; methylenedithiol compounds represented by the general formula $HS(CH_2)_mSH$ (wherein $m$ is a positive integer), such as, ethanedithiol, propanedithiol, and the like; and other SH-containing compounds, such as methoxyethanethiol, ethoxyethanethiol, mercaptotetrahydrofuran, 2-mercaptoethanol, and the like. These mercaptans may be used alone or as a mixture of two or more mercaptans.

The reaction shown by the aforesaid reaction Formula 1 is an exothermic reaction and is generally conducted at a temperature of 0–50° C. When the reaction temperature is higher than 50° C. the reaction proceeds too rapidly, which is undesirable. On the other hand, since the hydrolysis represented by the reaction Formula 2 mentioned above is an endothermic reaction, it occurs by heating the reaction system. The temperature for the hydrolysis depends on the kind of the mercaptide but in general, as the reaction system is heated to such an extent that the system is concentrated, hydrolysis occurs.

An aqueous solution of the alkali metal mercaptide prepared by the reaction of this invention may be separated from by-product calcium sulfate by any of the art recognized techniques, such as, settling followed by decantation, a centrifugal separation and a vacuum filtration.

After removing calcium sulfate, the filtrate containing the alkali metal mercaptide is concentrated by heating. According to this process, the alkali metal mercaptide is hydrolyzed to the alkali metal hydroxide and the mercaptan by heating. Normally, the mercaptan thus formed can be recovered and reused. In these special instances, however, when the mercaptan cannot be recovered in sufficient yields, super-heated steam at a temperature higher than the boiling point of the concentrated solution may be blown into the solution to increase mercaptan recovery.

From the viewpoint of recovery of the mercaptans, it is generally most economically advantageous to use low boiling point mercaptans, such as, methyl mercaptan, ethyl mercaptan, isopropyl mercaptan, and butyl mercaptan. When such mercaptans are used as the starting material of this invention, they can be almost completely recovered in the concentration step at temperatures of less than 100° C. By conducting the concentration at these comparatively low temperatures, the alkali metal hydroxide can be substantially recovered containing little or no mercaptan. The mercaptan recovered from the concentration step for the reaction product is then subjected to a proper separation such as condensing separation, gaseous separation, fractionation, or extraction depending upon the particular mercaptan used.

The concentrated solution of the alkali metal hydroxide thus obtained is cooled, decolored, and, if necessary, purified by any of the art recognized means, such as recrystallization. The alkali metal sulfate is deposited when the reaction product is cooled and concentrated during the recovery of the alkali metal hydroxide, and the mercaptan reused.

This invention will now be explained further by the reference to the following examples which are presented for purposes of illustration only.

EXAMPLE 1

A 500 ml. flask equipped with a stirrer is provided with a thermometer and a dropping funnel and cooled to 18° C. by cooling water. 90 g. of anhydrous sodium sulfate, 50 g. of calcium hydroxide, and 200 ml. of water were introduced into the flask and stirred. 100 ml. of ethyl mercaptan was added dropwise to the mixture through the dropping funnel over a fifteen minute period.

The reaction was completed after one hour and thereafter, calcium sulfate was separated by means of a glass filter. By this procedure, 169 ml. of filtrate containing 4.16 N of sodium mercaptide was obtained.

When the calcium sulfate was washed with 100 ml. of water, 114 ml. of an aqueous 2.80 N sodium mercaptide solution was obtained. By repeating the same recovery procedure, 106 ml. of a solution containing 1.13 N of the mercaptide and 97 ml. of a solution containing 0.29 N of the mercaptan were recovered in the second and third steps, respectively.

By summing the whole sodium mercaptide solution thus recovered, the conversion ratio of sodium sulfate to sodium mercaptide was 92.5%.

When 169 ml. of the filtrate (4.16 N of sodium mercaptide) recovered above by filtration was combined with 114 ml. of the aqueous solution of sodium mercaptide recovered by the aforesaid first water-washing, the concentration of the resultant solution of sodium mercaptide was 3.62 N. By concentrating 250 ml. of the resultant solution by means of an evaporator equipped with a condenser, an aqueous 50% sodium hydroxide solution was obtained and simultaneously 66 ml. of ethyl mercaptan was recovered, which corresponded to 99% by weight of the entire ethyl mercaptan present in the solution. The sodium hydroxide solution obtained was discolored when exposed to air, which showed that a small amount of ethyl mercaptide remained in the solution. By diluting the solution of sodium hydroxide into a solution thereof of 38% in concentration followed by purification, 66 ml. of an aqueous pure solution containing 13.4 N of sodium hydroxide was obtained.

EXAMPLE 2

In the same apparatus as in Example 1, 75 g. of potassium sulfate, 31 g. of calcium hydroxide and 200 ml. of water were mixed with stirring and 63 ml. of ethyl mercaptan was added dropwise over a twenty minute period. The reaction was finished after 50 minutes and calcium sulfate by-produced removed by means of a glass filter. 180 ml. of the filtrate containing 3.50 N of potassium mercaptide was obtained.

By washing the calcium sulfate thus separated with 100 ml. of water repeatedly, an aqueous solution containing 1.45 N of potassium mercaptide and an aqueous solution containing 0.31 N of potassium mercaptide were recovered in the first and second steps respectively. The conversion ratio of potassium sulfate to potassium mercaptide was 94%.

The filtrate recovered from the aforesaid filtration step was combined with the aqueous solution from the first washing step to provide 283 ml. of an aqueous solution containing 2.76 N of potassium mercaptide. By concentrating the resultant solution, 46 ml. of an aqueous 43% potassium hydroxide solution was obtained and at the same time 55 ml. of ethyl mercaptan was recovered, which corresponded to 96% of the entire ethyl mercaptan in the solution.

The concentrated potassium hydroxide solution contained a small proportion of mercaptan but by blowing decarboxylated air into the solution while maintaining the system at 80° C., the mercaptan could be removed as a disulfide.

EXAMPLE 3

In a five liter closed-type reactor equipped with a stirrer, a thermometer, a constant-pressure gas inlet, and a condenser, 0.23 kg. of calcium oxide was mixed with 0.80 liter of water under cooling to provide a milk of lime. While maintaining the system at 20° C., after replacing the inside air with nitrogen gas, the pressure of the reactor was reduced to about 100 mm. Hg. Thereafter by continuously blowing methyl mercaptan from a bomb, the pressure inside the flask became 1.0 atm., and an aqueous 32% sodium sulfate solution was introduced, at a rate of 2.5 ml./min. for 53 minutes. Methyl mercaptan was continuously blown into the system until an amount of 3% excess of the theoretical amount was present. After discontinuing the methyl mercaptan feed, the system was stirred further for 30 minutes. The slurry thus formed was withdrawn, the byproduct calcium sulfate separated by means of a Buchner funnel. The calcium sulfate thus separated was washed twice with 1.0 liter of pure water. By this procedure, 1.73 liters of a filtrate containing 3.45 N of sodium mercaptide was obtained. The conversion ratio of sodium sulfate to sodium mercaptide was 96%.

The concentration of a mixture of the filtrate recovered in the filtration step and the aqueous solution recovered in the first water-washing step was 2.74 N. 2.70 liters of the resultant solution was boiled in a concentrator until the boiling point of the solution became 155° C. to concentrate the sodium hydroxide and to separate the mercaptan. The methyl mercaptan thus recovered was compressed and stored for reuse. The yield of mercaptan recovery was 98%.

The concentrated sodium hydroxide solution was diluted to 38% and cooled to crystallize sodium hydroxide, which was recovered and redissolved to provide 126 ml. of a pure aqueous sodium hydroxide solution. The residual solution in the separation step could be effectively purified by mixing in the next concentration step.

The calcium sulfate was washed twice with water, once with diluted acid, to remove any alkali attached thereto, rinsed with water, and then dried to provide 0.68 kg. of the crystal of calcium sulfate.

EXAMPLE 4

In the same apparatus as in Example 1, 90 g. of anhydrous sodium sulfate, 50 g. of calcium hydroxide and 300 ml. of water were mixed with stirring and thereafter 150 ml. of isopropyl mercaptan was added dropwise to the system through the dropping funnel over a twenty minute period. The reaction was completed after one hour and calcium sulfate byproduct was separated by filtration, whereby 325 ml. of a filtrate containing 2.50 N of sodium isopropylmercaptide was obtained.

The calcium sulfate separated was washed with water or a diluted sodium isopropylmercaptide solution. The conversion ratio of sodium sulfate to sodium isopropylmercaptide was 75%. The sodium isopropylmercaptide solution was subjected to distillation to separate the mercaptan and to concentrate the mercaptide. That is, when 100 ml. of the solution containing 2.5 N sodium isopropylmercaptide was concentrated, isopropyl mercaptan corresponding to 75% of the whole mercaptan was distilled out before boiling the water. When the boiling point of the system reached 120° C., the content of isopropyl mercaptan was reduced to 2.0% and further when the boiling point of the system reached 140° C., the content of remaining isopropyl mercaptan was reduced to 0.8%.

The amount of isopropyl mercaptan recovered after the concentration and the separation of the mercaptan corresponded to 98% of the mercaptan supplied to the reaction. After the recovery of sodium isopropylmercaptide, 16 ml. of a concentrated 15 N sodium hydroxide solution was obtained as a residue. By removing sulfides, etc., remaining in the sodium hydroxide solution by a conventional manner, a pure sodium hydroxide solution was obtained.

EXAMPLE 5

A 500 ml. flask equipped with a stirrer, a thermometer, and a dropping funnel was cooled to 18° C. by cooling water, and 90 g. of anhydrous sodium sulfate, 50 g. of calcium hydroxide, and 200 ml. of water were added thereto with stirring. Thereafter 100 ml. of n-butyl mercaptan was added dropwise to the mixture through the dropping funnel over a fifteen minute period. The reaction was completed after 60 minutes and thereafter, sodium n-butylmercaptide was separated from calcium sulfate by-produced by means of a glass filter. The conversion ratio of sodium sulfate to sodium n-butylmercaptide was 85%. Then, 100 ml. of the aqueous solution containing 3.0 N of sodium n-butylmercaptide thus separated was concentrated to remove the mercaptan. Thus, 65% of n-butyl mercaptan was recovered before distillation of water. Thereafter, the mercaptan was distilled out together with water, and when the boiling point of the solution reached 135° C., the content of remaining n-butyl mercaptan was 3.0%. The remaining solution was mixed with 20 ml. of water and the resultant solution was concentrated until the boiling point of the solution became 155° C., the content of remaining n-butyl mercaptan was reduced to 0.7%. On the other hand, the remaining solution of sodium hydroxide was purified as in Example 1 to provide 48 ml. of a pure solution containing 13 N of sodium hydroxide.

What is claimed is:

1. A process for the production of an alkali metal hydroxide which comprises reacting in an aqueous medium an alkali metal sulfate with a mercaptan and a member selected from the group consisting of calcium hydroxide and calcium oxide to form the corresponding alkali metal mercaptide, and hydrolyzing said alkali metal mercaptide to form the corresponding alkali metal hydroxide.

2. The process as claimed in claim 1 wherein said alkali metal sulfate is selected from sodium sulfate and potassium sulfate.

3. The process as claimed in claim 1 wherein said mercaptan is selected from the compounds represented by the general formula $C_nH_{2n+1}SH$ wherein $n$ represents a positive integer.

4. The process as claimed in claim 3 wherein said compound is selected from methyl mercaptan, ethyl mercaptan, propyl mercaptan and butyl mercaptan.

5. The process as claimed in claim 1 wherein said mercaptan is selected from the compounds represented by the general formula $HS(CH_2)_mSH$ wherein $m$ is a positive integer.

6. The process as claimed in claim 1, wherein said reaction is conducted at a reaction temperature of 0–50° C. and the hydrolysis is conducted under heating.

7. The process as claimed in claim 1, wherein, after the formation of the alkali metal mercaptide, by-product calcium sulfate is removed from the reaction product liquid and the aqueous solution containing the alkali metal mercaptide thus obtained is subjected to hydrolysis by heating to concentrate the solution, whereby the alkali metal hydroxide is formed and simultaneously the mercaptan formed by the hydrolysis is recovered.

8. The process as claimed in claim 7 wherein the calcium sulfate separated from the reaction product is washed with water to recover therefrom the alkali metal mercaptide.

9. The process as claimed in claim 7 wherein the mercaptan thus recovered is recycled to the reaction system for forming the alkali metal mercaptide.

10. A process for the production of an alkali metal hydroxide which comprises reacting at a temperature of from 0 to 50° C. an alkali metal sulfate selected from the group consisting of sodium sulfate and potassium sulfate with a mercaptan selected from the group consisting of methyl mercaptan, ethyl mercaptan, propyl mercaptan and butyl mercaptan and a member selected from the group consisting of calcium hydroxide and calcium oxide to form the corresponding alkali metal mercaptide, and hydrolyzing, with the application of heat, said alkali metal mercaptide to form the corresponding alkali metal hydroxide.

11. A process as in claim 10, wherein, after the formation of the alkali metal mercaptide, by-product calcium sulfate is removed from the reaction product liquid and the aqueous solution containing the alkali metal mercaptide thus obtained is subjected to hydrolysis by heating to a temperature less than 100° C. to concentrate the solution, whereby the alkali metal hydroxide is formed and simultaneously the mercaptan formed by the hydrolysis is recovered.

References Cited

UNITED STATES PATENTS

| 2,152,724 | 4/1939 | Yabroff et al. | 23—184X |
| 2,218,610 | 10/1940 | Hewlett | 23—184 |
| 2,354,974 | 8/1944 | Harnsberger | 23—184 |
| 2,383,247 | 8/1945 | Gardner | 23—184X |
| 2,574,525 | 11/1951 | Bond et al. | 23—184 |
| 3,291,566 | 12/1966 | Mattox | 23—184 |

EDWARD STERN, Primary Examiner

U.S. Cl. X.R.

23—122; 260—609